(12) United States Patent
Kubota et al.

(10) Patent No.: US 10,647,135 B2
(45) Date of Patent: May 12, 2020

(54) TAPE CARTRIDGE

(71) Applicant: Seiko Epson Corporation, Tokyo (JP)

(72) Inventors: Tomoyuki Kubota, Suwa (JP); Taishi Sasaki, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 140 days.

(21) Appl. No.: 15/563,283

(22) PCT Filed: Mar. 24, 2016

(86) PCT No.: PCT/JP2016/059519
§ 371 (c)(1),
(2) Date: Sep. 29, 2017

(87) PCT Pub. No.: WO2016/158710
PCT Pub. Date: Oct. 6, 2016

(65) Prior Publication Data
US 2018/0065385 A1 Mar. 8, 2018

(30) Foreign Application Priority Data
Mar. 30, 2015 (JP) ................................. 2015-068962

(51) Int. Cl.
*B41J 15/04* (2006.01)
*B65H 19/12* (2006.01)
(Continued)

(52) U.S. Cl.
CPC .......... *B41J 15/044* (2013.01); *B41J 3/4075* (2013.01); *B41J 11/009* (2013.01);
(Continued)

(58) Field of Classification Search
CPC .... B41J 15/044; B41J 3/4075; B41J 11/0025; B41J 11/009; B41J 11/04; B41J 15/04;
(Continued)

(56) References Cited

U.S. PATENT DOCUMENTS 4,259,026 A * 3/1981 Hanaoka ................. B41J 15/06
400/185
5,653,542 A * 8/1997 Sugimoto ................ B26D 5/00
400/207
(Continued)

FOREIGN PATENT DOCUMENTS

| JP | 2010-125777 A | 6/2010 |
|---|---|---|
| JP | 2014-184558 A | 10/2014 |
| JP | 2014-205339 A | 10/2014 |
| WO | WO-2014/148062 A1 | 9/2014 |
| WO | WO 2014148061 * | 9/2014 |

*Primary Examiner* — David H Banh
(74) *Attorney, Agent, or Firm* — Foley & Lardner LLP

(57) ABSTRACT

A tape cartridge which is mounted in a tape printing apparatus provided with a detection part, includes a tape-shaped member which has a detection protrusion of which a lateral side partially protrudes in a tape width direction and a cartridge case in which a tape roll formed by winding the tape-shaped member into a roll shape is contained. In the tape cartridge, an exposed area is provided outside the cartridge case, the exposed area being where the detection protrusion provided in the tape-shaped member delivered from the tape roll and fed in a length direction of the tape-shaped member is exposed, the cartridge case has a cover which covers the tape-shaped member delivered from the tape roll in a tape feeding upstream side from the exposed area, and the cover includes a first cover, a second cover and a position regulating part.

4 Claims, 12 Drawing Sheets

(51) Int. Cl.
*B41J 11/00* (2006.01)
*B41J 3/407* (2006.01)
*B41J 17/04* (2006.01)
*B41J 25/304* (2006.01)
*B41J 11/04* (2006.01)
*B41J 11/70* (2006.01)
*B41J 17/32* (2006.01)
*G11B 15/68* (2006.01)

(52) U.S. Cl.
CPC ........ *B41J 11/0025* (2013.01); *B41J 11/0095* (2013.01); *B41J 17/04* (2013.01); *B41J 25/304* (2013.01); *B65H 19/12* (2013.01); *B41J 11/04* (2013.01); *B41J 11/703* (2013.01); *B41J 17/32* (2013.01); *G11B 15/6815* (2013.01)

(58) Field of Classification Search
CPC ........ B41J 17/04; B41J 25/304; B41J 11/703; B41J 17/32; G11B 15/6815; B65H 19/12
See application file for complete search history.

(56) References Cited

U.S. PATENT DOCUMENTS

| | | | | |
|---|---|---|---|---|
| 5,921,688 | A * | 7/1999 | Furuya | B41J 17/32 |
| | | | | 101/288 |
| 6,520,696 | B2 * | 2/2003 | Huss | B41J 3/4075 |
| | | | | 400/207 |
| 9,539,832 | B2 * | 1/2017 | Sasaki | B41J 15/044 |
| 9,545,802 | B2 * | 1/2017 | Sasaki | B41J 3/4075 |
| 9,586,423 | B2 * | 3/2017 | Sasaki | B41J 11/703 |
| 9,630,429 | B2 * | 4/2017 | Sasaki | B41J 11/009 |
| 9,789,713 | B2 * | 10/2017 | Sasaki | B41J 11/703 |
| 2006/0233582 | A1 * | 10/2006 | Horiuchi | B41J 15/044 |
| | | | | 400/208 |
| 2012/0009001 | A1 | 1/2012 | Sago et al. | |
| 2013/0114988 | A1 * | 5/2013 | Sodeyama | B41J 3/4075 |
| | | | | 400/613 |
| 2016/0271978 | A1 | 9/2016 | Sasaki et al. | |
| 2016/0297217 | A1 | 10/2016 | Sasaki | |
| 2016/0297218 | A1 * | 10/2016 | Sasaki | B41J 3/4075 |

* cited by examiner

FIG. 1
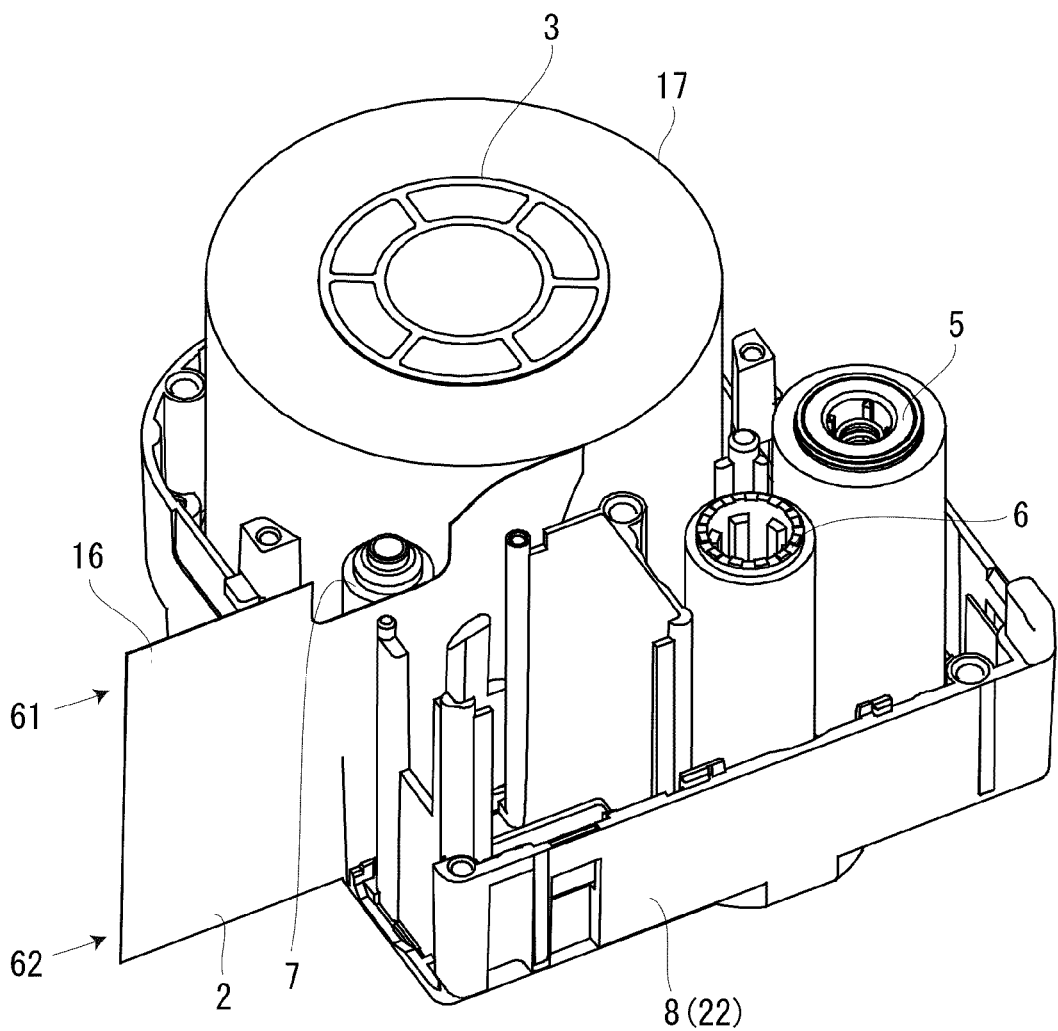
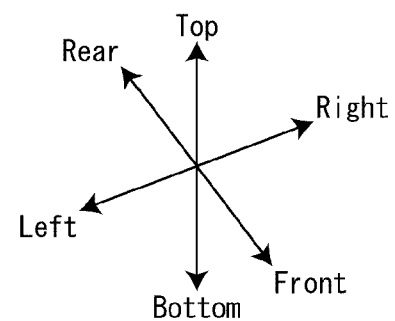

FIG. 3
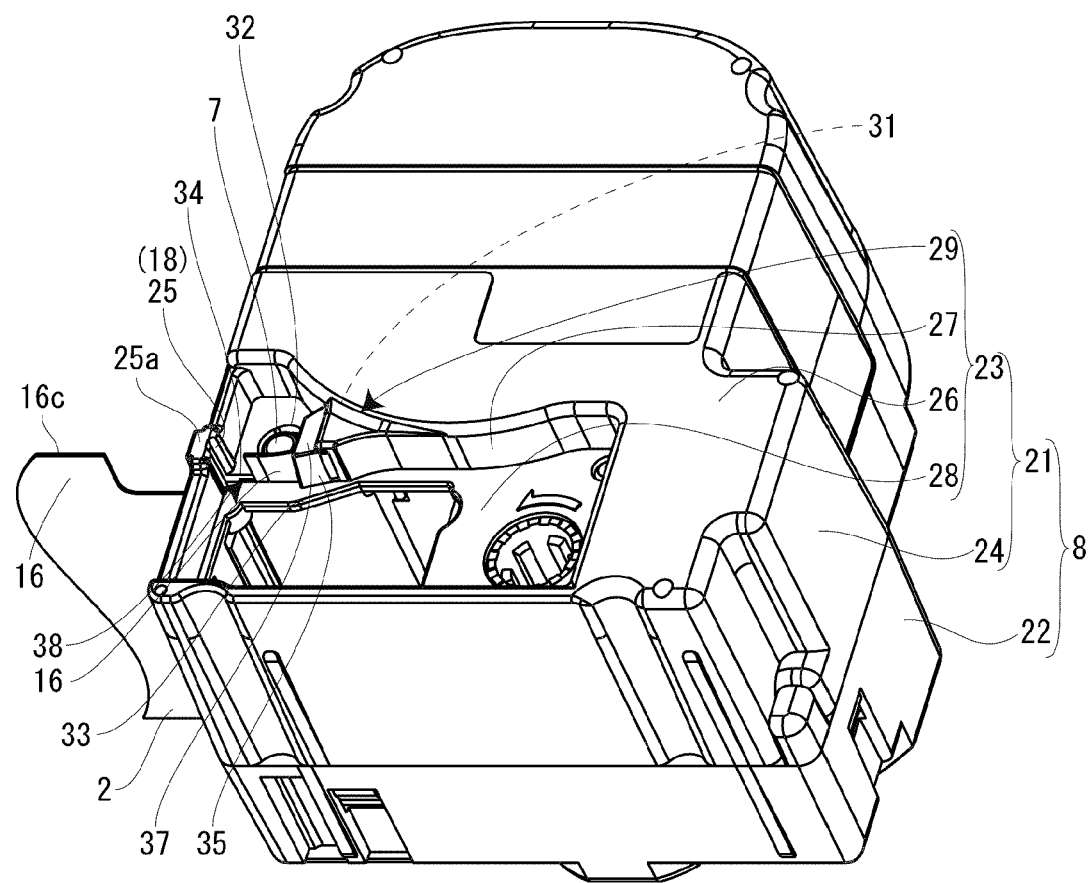
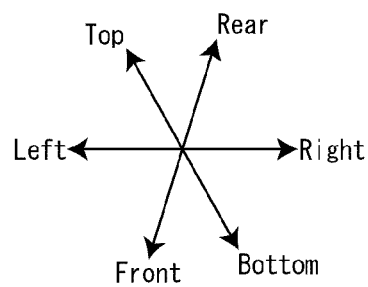

FIG. 4
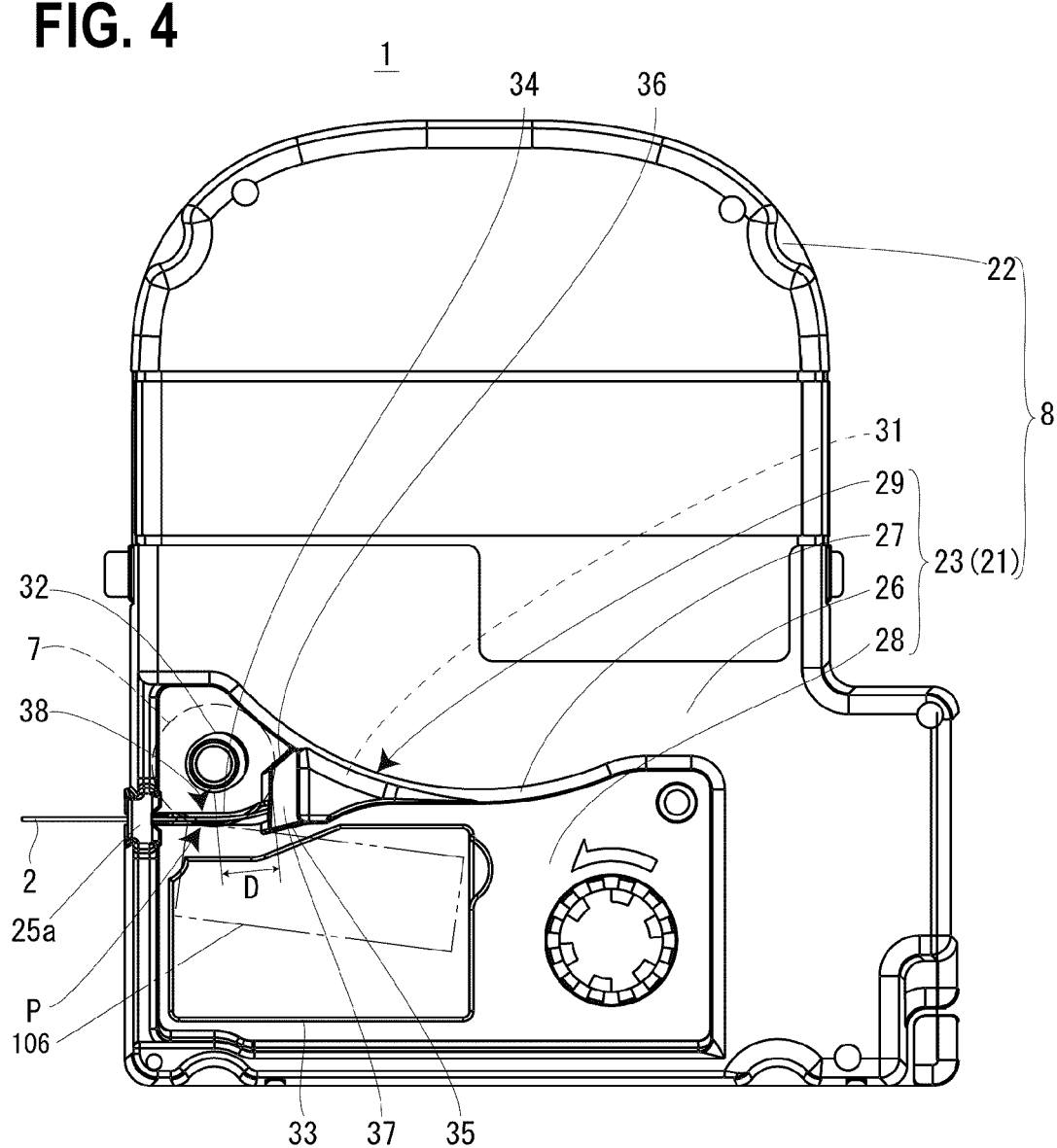
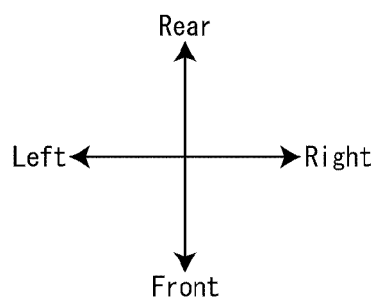

FIG. 5
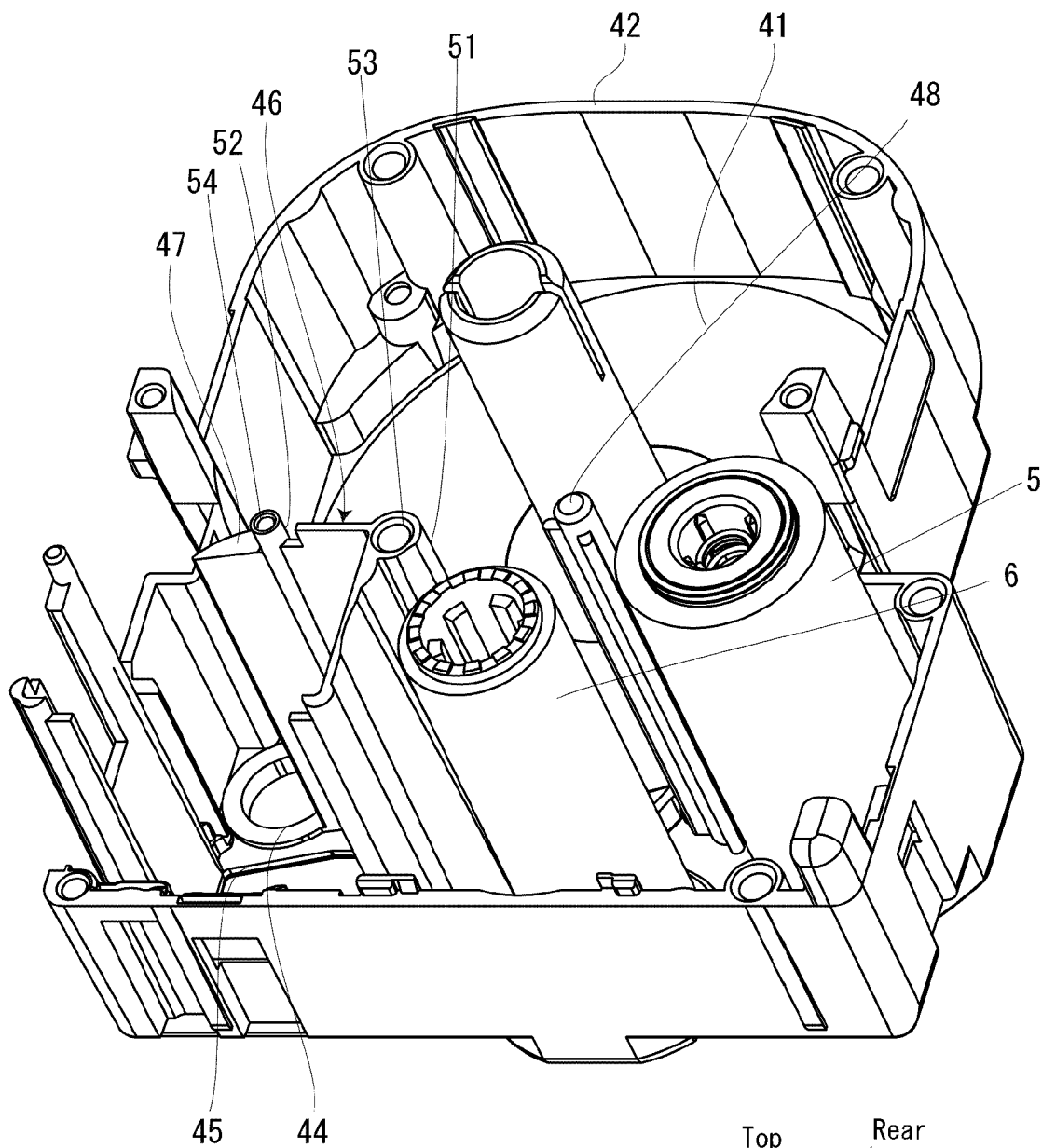
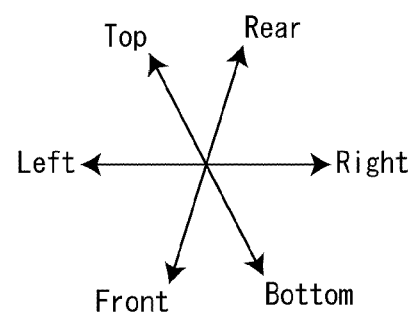

FIG. 6
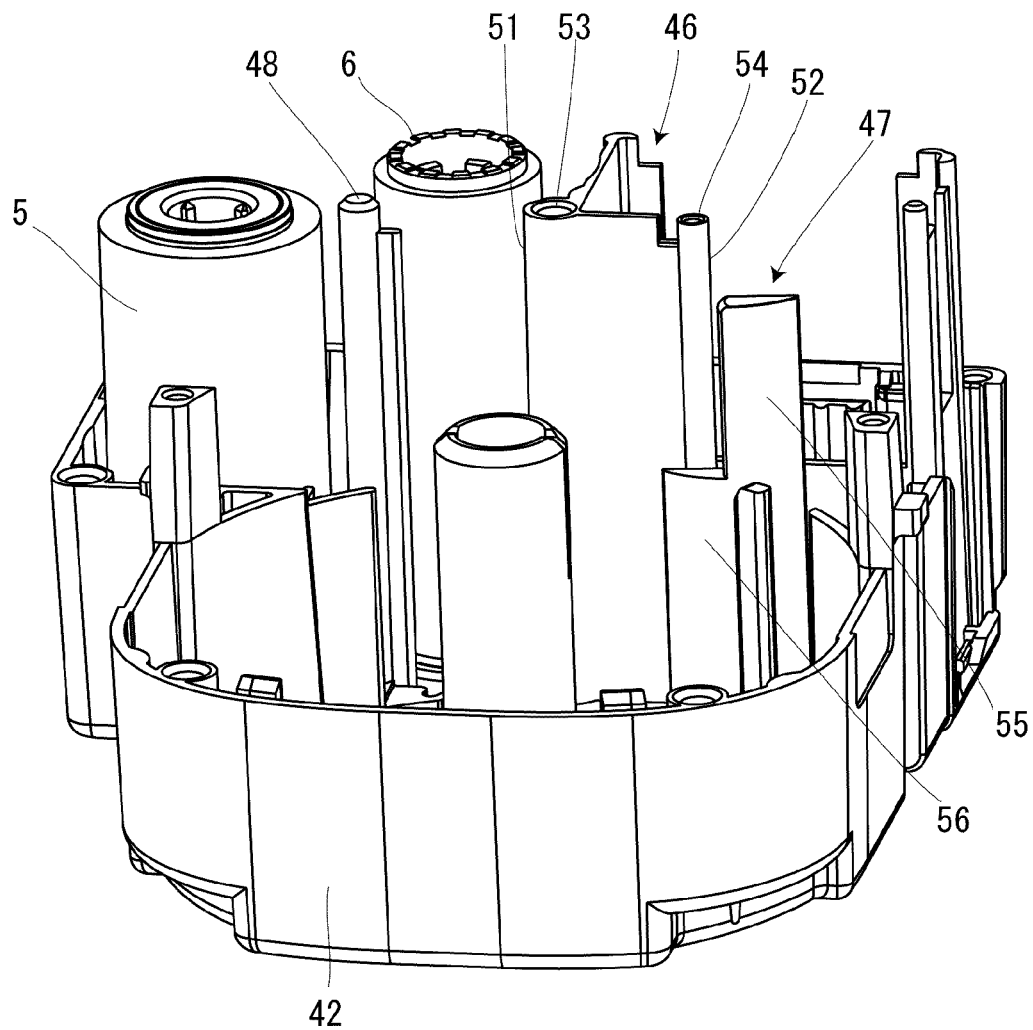
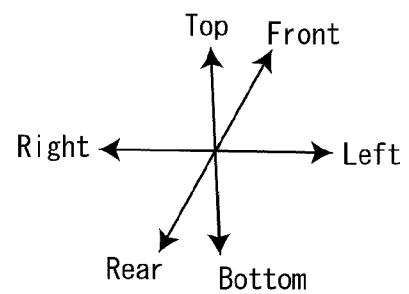

FIG. 8
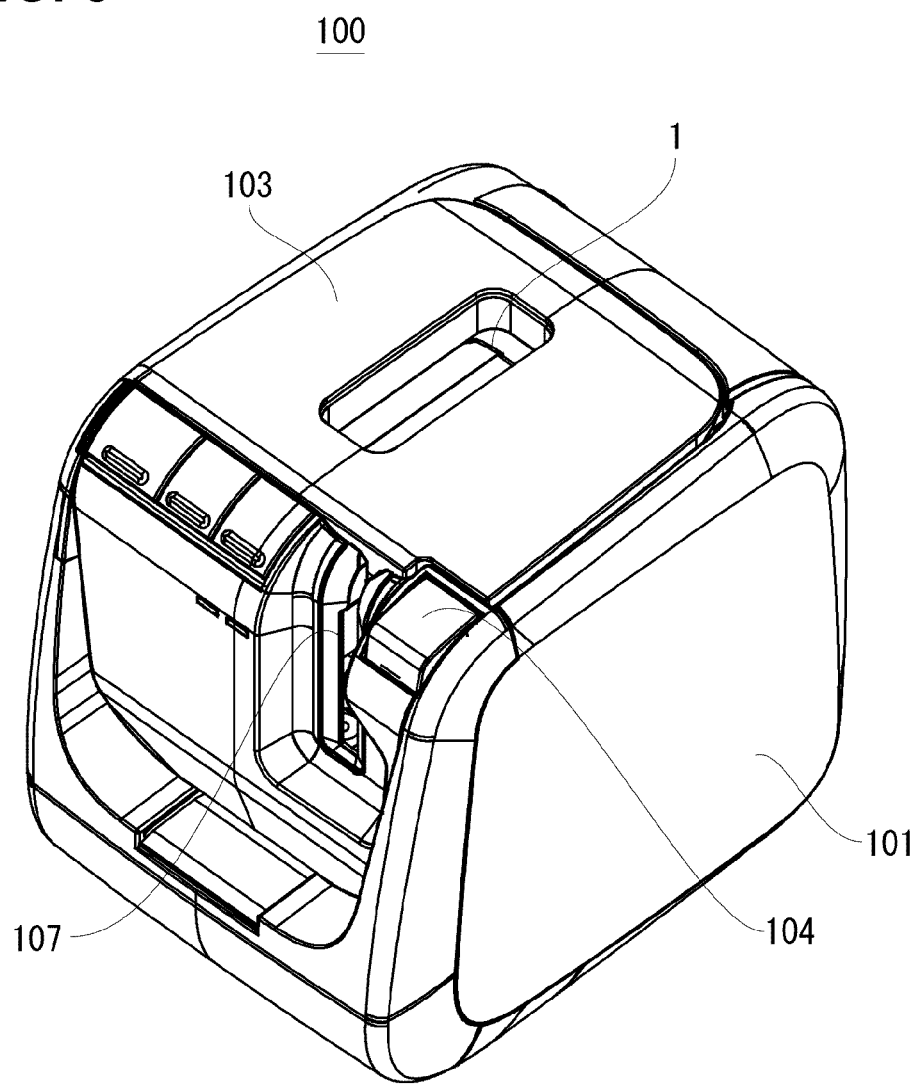
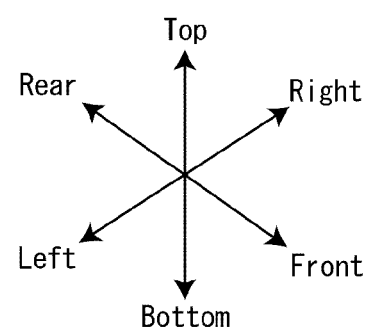

TAPE CARTRIDGE

TECHNICAL FIELD

The present invention relates to a tape cartridge which is mounted in a tape printing apparatus.

BACKGROUND ART

In the related art, there is known a tape cartridge which is mounted in an apparatus body provided with an optical sensor, the tape cartridge including a label tape having a detection target part whose a lateral side protrudes in a tape width direction and a cartridge case which contains a tape roll around which the label tape is wound in a roll shape. An outer surface of the cartridge case is provided with an exposed area in which the detection target part is exposed such that the passage of the detection target part is detected by the optical sensor when the label tape is delivered from the tape roll in a state where the tape cartridge is mounted on the apparatus body. Further, the cartridge case has a tape cover, which covers the front and back of the detection target part of the label tape delivered from the tape roll, on a tape feeding upstream side from the exposed area (see Patent Literature 1).

CITATION LIST

Patent Literature

[Patent Literature 1]: WO 2014/148062

SUMMARY OF THE INVENTION

Technical Problem

The present inventor has found the following problems.

In the tape cartridge according to the related art, a protruding end of a detection protrusion is not in contact with the cartridge case in the area where the exposed area and the cover are provided. Therefore, a position of a tape-shaped member is not regulated on a protruding side of the detection protrusion in the area where the exposed area and the cover are provided. Accordingly, when a force acts on the tape-shaped member so that the tape-shaped member is obliquely fed toward the protruding side of the detection protrusion, the tape-shaped member obliquely moves toward the protruding side of the detection protrusion in the area where the exposed area and the cover are provided.

An object of the present invention is to provide a tape cartridge in which a tape-shaped member is prevented from obliquely moving toward the protruding side of the detection protrusion.

Solution to Problem

A tape cartridge of the present invention is a tape cartridge which is mounted in a tape printing apparatus provided with a detection part. The tape cartridge includes a tape-shaped member which has a detection protrusion of which a lateral side partially protrudes in a tape width direction, and a cartridge case in which a tape roll around which the tape-shaped member is wound in a roll shape is contained. An exposed area is provided outside the cartridge case, the exposed area being where the detection protrusion provided in the tape-shaped member delivered from the tape roll and fed in a length direction of the tape-shaped member is exposed, the cartridge case has a cover which covers the tape-shaped member delivered from the tape roll in a tape feeding upstream side from the exposed area. The cover includes a first cover which covers either one of a front side or a back side of the detection protrusion, a second cover which covers the other of the front side or the back side of the detection protrusion, and a position regulating part which is provided to connect the first cover and the second cover, and contacts a protruding end of the detection protrusion to regulate a position of the tape-shaped member in a protruding side of the detection protrusion.

With this configuration, the position of the tape-shaped member on the protruding side of the detection protrusion is regulated by the position regulating part in the area where the cover is provided. For this reason, even when the force acts on the tape-shaped member so that the tape-shaped member is obliquely fed toward the protruding side of the detection protrusion, the tape-shaped member is prevented from obliquely moving toward the protruding side of the detection protrusion in the area where the exposed area and the cover are provided.

In this case, preferably, the cartridge case is provided with a protruding opening through which the detection protrusion protrudes, and the cover is provided in a tape feeding upstream end of the protruding opening.

In this case, preferably, the tape cartridge further includes a platen roller which feeds the tape-shaped member by rotation, the tape-shaped member nipped between a printing head and the platen roller. In addition, the cartridge case is provided with a platen engaging hole with which the platen roller is engaged, and a distance between an end of the platen engaging hole on a side of the protruding opening and a tape feeding downstream end of the position regulating part is 6 mm or less.

With this configuration, in a position considerably close to a nip position between the platen roller and the printing head, the protruding end of the detection protrusion is in contact with the position regulating part and the position of the tape-shaped member on the protruding side of the detection protrusion is regulated. For this reason, even when the force acts on the tape-shaped member at the nip position so that the tape-shaped member is obliquely fed toward the protruding side of the detection protrusion, the tape-shaped member is further effectively prevented from obliquely moving toward the protruding side of the detection protrusion in the area where the exposed area and the cover are provided.

BRIEF DESCRIPTION OF THE DRAWINGS

FIG. 1 is a perspective view illustrating an appearance of a tape cartridge illustrated in FIG. 3 in a case where an upper case is removed.

FIG. 3 is a perspective view of the tape cartridge according to one embodiment of the present invention.

FIG. 4 is a top view of the tape cartridge illustrated in FIG. 3.

FIG. 5 is a perspective view of a lower case of the tape cartridge illustrated in FIG. 3.

FIG. 6 is a perspective view of the lower case of the tape cartridge illustrated in FIG. 3 when viewed in an angle different from that of FIG. 5.

FIG. 8 is a perspective view illustrating a tape printing apparatus mounted with the tape cartridge illustrated in FIG. 3 in a state where an opening/closing lid is closed.

In FIGS. 12A to 12C, a left side in the drawing is a view when viewed from above, and a right side in the drawing is a view when viewed from a direction orthogonal to the bending direction of the retracting prevention part in a horizontal plane.

DESCRIPTION OF EMBODIMENTS

Figure 2:
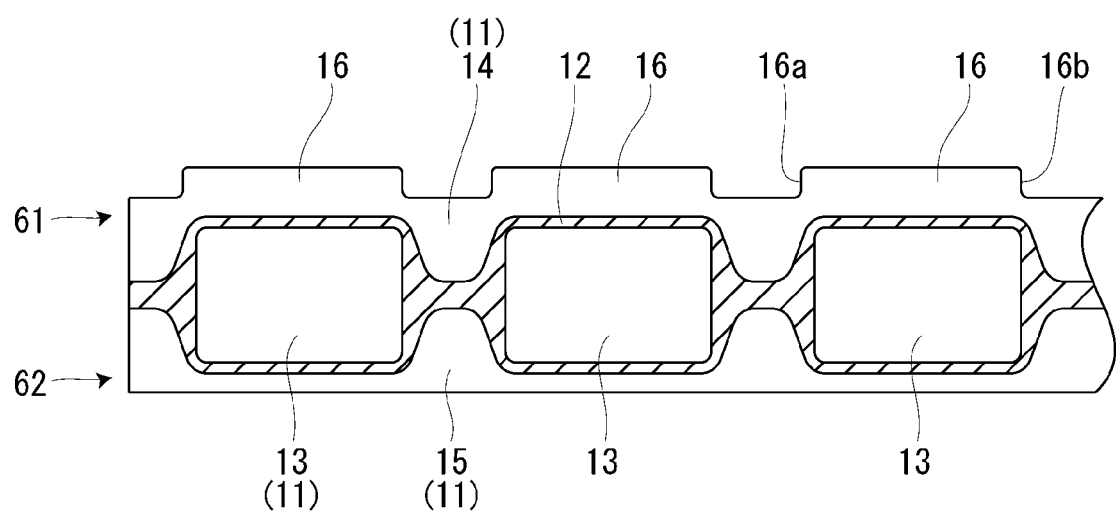
FIG. 2 is a view illustrating a label tape contained in the tape cartridge illustrated in FIG. 3.

Hereinafter, a tape cartridge 1 according to one embodiment of the present invention and a tape printing apparatus 100 mounted with the tape cartridge 1 will be described with reference to the accompanying drawings. The tape cartridge 1 is used, for example, to make a label for equipment management, and includes a plurality of label parts 13 which are cut in a regular shape in advance. Incidentally, hereinafter, the description will be given about the drawings by using "front", "rear", "left", "right", "top", and "bottom" (in the drawings, these directions are designated by "Front", "Rear", "Left", "Right", "Top", and "Bottom" in order), and the like. Such directions are used for convenience of explanation, and the implementation of the present invention is not limited to such directions.

The tape cartridge 1 will be described with reference to FIG. 1. The tape cartridge 1 includes a label tape 2, a tape reel 3, an ink ribbon 4 (see FIG. 7), a ribbon delivery reel 5, a ribbon winding reel 6, a platen roller 7, and a cartridge case 8 which contains these components.

The label tape 2 will be described with reference to FIG. 2. The label tape 2 includes a printing tape 11 and a mount tape 12. The printing tape 11 is releasably stuck to one surface of the mount tape 12. The plurality of label parts 13, a first non-label part 14, and a second non-label part 15 are formed in the printing tape 11. The plurality of label parts 13 are arranged at substantially the same interval along a longitudinal direction (hereinafter, referred to as a "tape length direction") of the printing tape 11, and are stuck to the mount tape 12. The label part 13 is a place where the printing is performed by the tape printing apparatus 100. The first non-label part 14 is formed along a first lateral side portion 61 provided with a detection protrusion 16 (to be described later), and is stuck to the mount tape 12. The second non-label part 15 is formed along a second lateral side portion 62 on an opposite side to the first lateral side portion 61 provided in the first non-label part 14, and is stuck to the mount tape 12.

Incidentally, the material of the printing tape 11 and the mount tape 12 is not limited particularly, and various materials such as paper and a resin film may be used.

The plurality of label parts 13, the first non-label part 14, and the second non-label part 15 are formed in the printing tape 11 by performing a die-cut processing on the printing tape 11 and residue-lifting unnecessary portions with substantially "edges of glasses" shape. That is, in the label tape 2, an inside of a portion where the unnecessary portion of the printing tape 11 is residue-lifted, and the mount tape 12 is exposed serves as the label part 13, and an outside of the portion where the mount tape 12 is exposed serves as the first non-label part 14 and the second non-label part 15. The first non-label part 14 and the second non-label part 15 are not places which are subjected to the printing. However, for example, in order that the label part 13 is prevented from being caught in an edge of a tape feeding port 18 when the label part 13 passes through the tape feeding port 18 (to be described later), the first non-label part 14 and the second non-label part 15 remain without residue-lifting.

Incidentally, the label part 13 illustrated in FIG. 2 has a corner round rectangular shape. However, a shape of the label part 13 is not limited particularly thereto, and may be a circular shape, an elliptic shape, and the like.

The label tape 2 includes a plurality of detection protrusions 16 of which one lateral side protrudes partially. The plurality of detection protrusions 16 are provided at substantially the same interval along the tape length direction in one-to-one correspondence to the plurality of label parts 13. The detection protrusion 16 serves as a portion where the tape cartridge 1 is mounted in the tape printing apparatus 100 and is detected by an optical sensor 105 (to be described later) provided in the tape printing apparatus 100 when the label tape 2 is delivered. Incidentally, in the detection protrusion 16, an end on a tape delivery front end side is referred to as a detection front-end 16a, and an end on a tape delivery rear end side is referred to as a detection rear-end 16b.

As illustrated in FIG. 1, the label tape 2 is formed to be a tape roll 17 wound in a roll shape, and is contained in the cartridge case 8. The label tape 2 is wound in the tape reel 3 in a state where the printing tape 11 is set as an outside, and the mount tape 12 is set as an inside. The tape roll 17 is contained in the cartridge case 8 in a state where in the first lateral side portion 61 and the second lateral side portion 62 of the label tape 2, the first lateral side portion 61 provided with the plurality of detection protrusions 16 is set as an upper side, and the second lateral side portion 62 is set as a lower side.

The ink ribbon 4 is contained in the cartridge case 8 in a state where the ribbon delivery reel 5 is wound in a roll shape. The ink ribbon 4 delivered from the ribbon delivery reel 5 is wound in the ribbon winding reel 6.

The platen roller 7 contacts the mount tape 12 side of the label tape 2. The platen roller 7 feeds the label tape 2 and the ink ribbon 4 in a rotating manner between the platen roller 7 and a printing head 106 (to be described later) provided in the tape printing apparatus 100. That is, the platen roller 7 is rotated by a power transmitted from the tape printing apparatus 100 in a state where the label tape 2 and the ink ribbon 4 are held between the platen roller 7 and the printing head 106. Accordingly, the label tape 2 is delivered from the tape roll 17, and the ink ribbon 4 is delivered from the ribbon delivery reel 5.

The cartridge case 8 will be described with reference to FIGS. 3 to 7. The tape feeding port 18 is provided on the left surface of the cartridge case 8. The label tape 2 delivered from the tape roll 17 is fed outside the cartridge case 8 through the tape feeding port 18.

The cartridge case 8 includes an upper case 21 and a lower case 22. The upper case 21 and the lower case 22 are combined to be separable to each other. Incidentally, the upper case 21 is configured of a semi-translucent resin, and the lower case 22 is configured of a light-shielding (for example, black) resin.

The upper case 21 includes a top wall 23 and an upper peripheral wall 24. The upper peripheral wall 24 is provided to protrude downward from the circumferential edge of the top wall 23. The left wall of the upper peripheral wall 24 is provided with an upper feeding port 25 notched in a slit shape from below. The upper feeding port 25 coincides with a lower feeding port 43 (to be described later), and serves as the tape feeding port 18. Incidentally, the uppers surface of the upper feeding port 25 is not opened, and the strength of the upper case 21 is secured by an upper edge 25a of the upper feeding port 25. In addition, the upper feeding port 25 has a such size that a gap is provided between a protruding end 16c of the detection protrusion 16 and the upper edge 25a of the upper feeding port 25 when the detection protrusion 16 passes through the upper feeding port 25 (see FIG. 11). Accordingly, even in a case where the label tape 2 obliquely moves slightly upward, it is prevented that the detection protrusion 16 is caught by the upper edge 25a of the upper feeding port 25 when the detection protrusion 16 passes through the upper feeding port 25.

The top wall 23 includes a high wall 26, a housing chamber forming part 27, a low wall 28, and a cover 29. The high wall 26 is an area where the tape roll 17 and the ribbon delivery reel 5 are positioned in top view. The substantially arc-shaped housing chamber forming part 27 forms a housing chamber in which the tape roll 17 is housed and which has a substantially circular shape in top view together with a portion of the upper peripheral wall 24. The housing chamber forming part 27 is provided with a protrusion through port 31. The protrusion through port 31 is connected with the upper feeding port 25 through a protruding opening 34 (to be described later). When the label tape 2 is delivered from the tape roll 17, the detection protrusion 16 passes through the protrusion through port 31, the protruding opening 34, and the upper feeding port 25 in order.

The low wall 28 is lower than the high wall 26 by one step with a step-shaped housing chamber forming part 27 interposed therebetween, that is, is formed to be close to the lower case 22. An upper platen engaging hole 32, an upper head opening 33, and the protruding opening 34 are provided in the low wall 28. The upper end of the platen roller 7 is engaged in the upper platen engaging hole 32. The upper platen engaging hole 32 is formed in a long hole which is long in a direction substantially parallel to a feeding path of the label tape 2 which reaches from the tape roll 17 to the platen roller 7. The printing head 106 enters the upper head opening 33 when the tape cartridge 1 is mounted in the tape printing apparatus 100 (see FIG. 9). In the protruding opening 34, one end is connected with the upper feeding port 25, and the other end is connected with the protrusion through port 31. When the label tape 2 is delivered from the tape roll 17, the detection protrusion 16 passing through the protrusion through port 31 protrudes upward from the protruding opening 34.

The cover 29 is provided in the tape feeding upstream end of the protruding opening 34. The cover 29 covers the detection protrusion 16 protruding upward from the protruding opening 34. The cover 29 prevents that the detection protrusion 16 protruding upward from the protruding opening 34 is bent by contacting a finger and the like of a user.

The cover 29 includes a first cover 35, a second cover 36, and a position regulating part 37. The first cover 35 is provided along the front edge of the protruding opening 34 to protrude obliquely leftward to the front side from the edge of the protrusion through port 31 which opposes the surface (on the printing tape 11 side) of the detection protrusion 16 passing through the protrusion through port 31. The first cover 35 covers the printing tape 11 side of the detection protrusion 16. The second cover 36 is provided along the rear edge of the protruding opening 34 to protrude obliquely leftward to the front side in substantially parallel to the first cover 35 from the edge of the protrusion through port 31 which opposes the surface (on the mount tape 12 side) of the detection protrusion 16 passing through the protrusion through port 31. The second cover 36 covers the mount tape 12 side of the detection protrusion 16. The position regulating part 37 is provided along the protruding opening 34 to protrude obliquely leftward to the front side from the upper edge of the protrusion through port 31. That is, the position regulating part 37 is provided to connect the upper end of the first cover 35 and the upper end of the second cover 36. A tape feeding downstream end in the position regulating part 37 is provided in at almost the same position in a tape feeding direction as each of the tape feeding downstream ends of the first cover 35 and the second cover 36. The position regulating part 37 regulates the position of the label tape 2 on the protruding side (upper side) of the detection protrusion 16 in such a manner that the protruding end 16c (upper end) of the detection protrusion 16 contacts the lower surface of the position regulating part 37.

The detection protrusion 16 passing through the cover 29 is fed to the upper feeding port 25 in the state of being exposed upward from the protruding opening 34. That is, the uppers surface of the low wall 28 between the cover 29 and the upper feeding port 25 serves as an exposed area 38 in which the detection protrusion 16 of the label tape 2 delivered from the tape roll 17 is exposed. In other words, the cover 29 is provided on the tape feeding upstream side from the exposed area 38. In the exposed area 38, the optical sensor 105 provided in the tape printing apparatus 100 detects the passage of the detection protrusion 16.

A distance (hereinafter, referred to as an "inter-platen cover distance D", see FIG. 4) between the end of the upper platen engaging hole 32 on the protruding opening 34 side and the tape feeding downstream end of the position regulating part 37 is preferably 6 mm or less as will described later.

Figure 7:
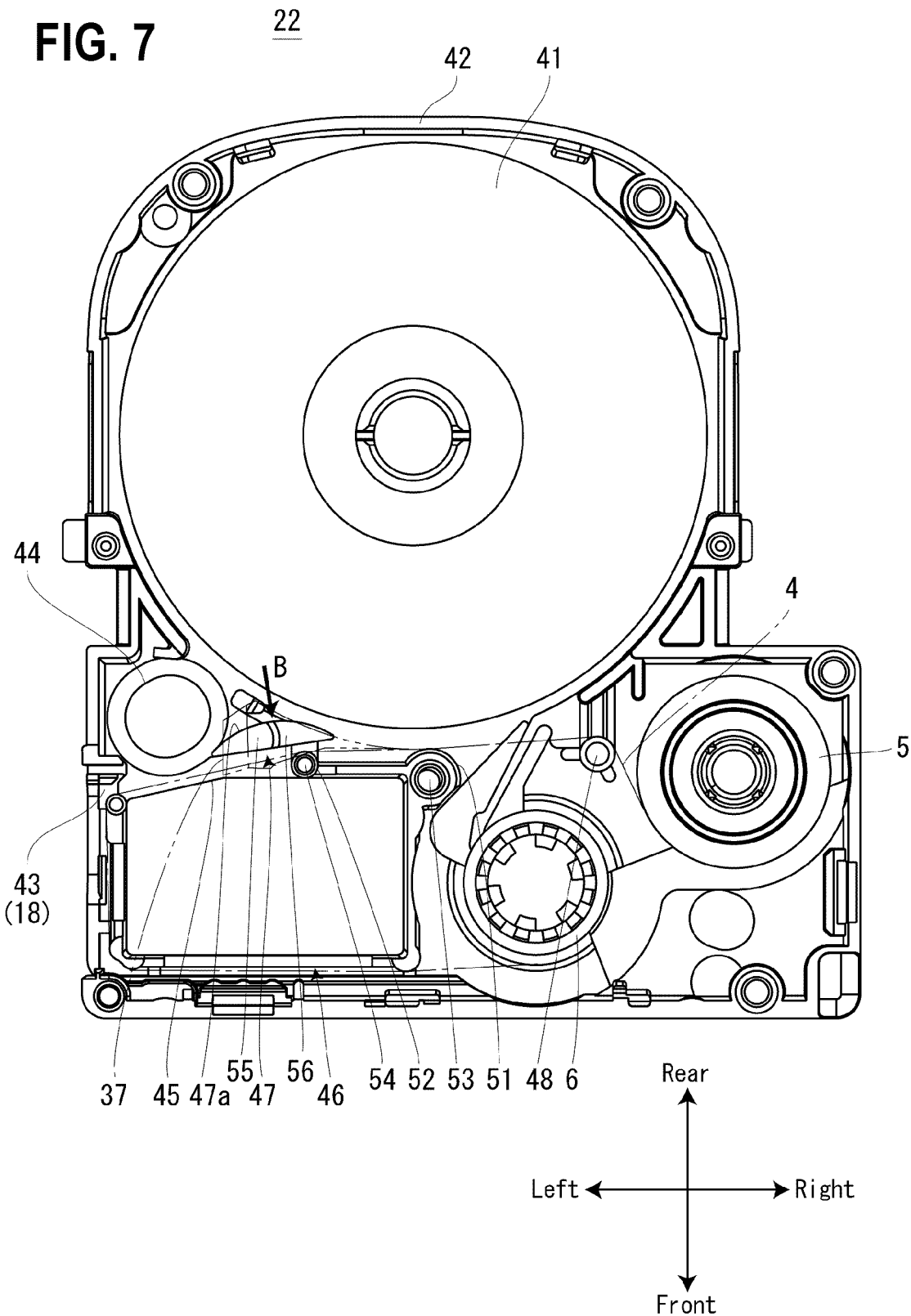
FIG. 7 is a top view of the lower case of the tape cartridge illustrated in FIG. 3.

As illustrated in FIGS. 5 to 7, the lower case 22 includes a bottom wall 41 and a lower peripheral wall 42. The lower peripheral wall 42 is provided to protrude upward from the circumferential edge of the bottom wall 41. In the left wall of the lower peripheral wall 42, the lower feeding port 43 notched from above is formed. As described above, the lower feeding port 43 coincides with the upper feeding port 25, and serves as the tape feeding port 18.

The bottom wall 41 opposes the top wall 23. The tape roll 17 is placed on the uppers surface of the bottom wall 41. A lower platen engaging hole 44 and a lower head opening 45 are provided in the bottom wall 41. The lower end of the platen roller 7 is engaged with the lower platen engaging hole 44. Similarly to the upper platen engaging hole 32, the lower platen engaging hole 44 is formed to be a long hole which is long in a substantially parallel direction to the feeding path of the label tape 2 which reaches from the tape roll 17 to the platen roller 7. For this reason, the platen roller 7 moves in the tape feeding direction in association with the delivering and the retracting of the label tape 2 within a range regulated by the upper platen engaging hole 32 and the lower platen engaging hole 44. The printing head 106 enters the lower head opening 45 when the tape cartridge 1 is mounted in the tape printing apparatus 100.

In the bottom wall 41, a ribbon guide pin 48, a ribbon guide wall 46, and a retracting prevention part 47 are provided to protrude toward the top wall 23. Incidentally, the above-described position regulating part 37 is positioned on the tip side of the retracting prevention part 47 in the protruding direction, that is, the upper side (see FIGS. 7 and 11).

The ribbon guide pin 48 is provided in the vicinity of the ribbon delivery reel 5. The ribbon guide pin 48 guides the fed ink ribbon 4 toward the ribbon guide wall 46 from the ribbon delivery reel 5. The ribbon guide wall 46 is provided in a substantially horizontal "C" shape in top view to surround the circumference of the substantially rectangular lower head opening 45 excluding a portion where the platen roller 7 opposes the printing head 106. The ribbon guide wall 46 guides the fed ink ribbon 4 to the ribbon winding reel 6 from the ribbon delivery reel 5.

The ribbon guide wall 46 includes a first ribbon guide part 51 and a second ribbon guide part 52. The first ribbon guide part 51 is provided in a position, which is the closest to the ribbon guide pin 48, of the ribbon guide wall 46, that is, in the right rear corner of the ribbon guide wall 46. The first ribbon guide part 51 is formed in a substantially cylindrical shape. That is, a through hole 53 which is penetrated in an axial direction is provided in the first ribbon guide part 51. A first engaging pin (not illustrated) protruding from the top wall 23 of the upper case 21 is engaged in the through hole 53.

The second ribbon guide part 52 is provided in a position on the ribbon feeding downstream side from the first ribbon guide part 51, that is, in one end of a substantially horizontal "C"-shaped ribbon guide wall 46. The second ribbon guide part 52 is formed in a columnar shape which is narrower than the outer diameter of the first ribbon guide part 51. An engaging hole 54 is provided on the uppers surface of the second ribbon guide part 52. A second engaging pin (not illustrated) protruding from the top wall 23 of the upper case 21 is engaged in the engaging hole 54. The ink ribbon 4 fed from the ribbon guide pin 48 is fed toward the platen roller 7 through between the second ribbon guide part 52 and the retracting prevention part 47 while slidingly contacting the outer circumferential surface of the first ribbon guide part 51 and the outer circumferential surface of the second ribbon guide part 52 in order.

The retracting prevention part 47 is provided on the tape feeding upstream side from the platen roller 7. The retracting prevention part 47 has a substantially arcuate shape in top view on the whole, and is formed such that the tip on the tape feeding upstream side has a notched columnar shape. In the retracting prevention part 47, the tip is not engaged in the top wall 23 of the upper case 21, and the retracting prevention part 47 is cantilevered by the bottom wall 41. In addition, the rear surface (hereinafter, referred to as a "tape contact surface 47a") of the retracting prevention part 47 contacts the printing tape 11 side of the label tape 2. For this reason, when the label tape 2 is fed, the retracting prevention part 47 receives the tension of the label tape 2, so as to be bent elastically to an almost front side. Hereinafter, a direction in which the retracting prevention part 47 is bent by the tension of the label tape 2 is referred to as a bending direction B. Incidentally, the above-described second ribbon guide part 52 is provided in the retracting prevention part 47 in the bending direction B.

The retracting prevention part 47 is molded integrally with a tape holding part 55 and an upstream base end 56. The tape holding part 55 holds the label tape 2 together with the platen roller 7 when the platen roller 7 moves to the tape feeding upstream side in association with the retracting of the label tape 2. Accordingly, it is suppressed that the label tape 2 is further retracted into the cartridge case 8. That is, it is suppressed that the tip of the label tape 2 enters the cartridge case 8. The upstream base end 56 is provided on the tape feeding upstream side of the tape holding part 55 and in the base end of the tape holding part 55. The upstream base end 56 is provided in the position of being overlapped with the second ribbon guide part 52 when viewed from the bending direction B. Incidentally, the protruding height of the tape holding part 55 is almost two-thirds of a tape width excluding the detection protrusion 16, and the protruding height of the upstream base end 56 is almost one-second of the tape width excluding the detection protrusion 16 (see FIG. 11).

In the area which reaches from the retracting prevention part 47 to the platen roller 7, since the printing tape 11 is fed along the tape contact surface 47a of the retracting prevention part 47 formed in a substantially arc shape and the outer circumferential surface of the platen roller 7, the tape length direction is curved in a substantially "S" shape. More strictly, when the label tape 2 is fed, in the retracting prevention part 47, the lower side of the label tape 2 which is a base end side of the retracting prevention part 47 is curved along the tape contact surface 47a, but the upper side of the label tape 2 which is the tip side of the retracting prevention part 47 has a substantially linear shape. The reason is that as described above, the protruding height of the tape holding part 55 of the retracting prevention part 47 is merely about two-thirds of the tape width excluding the detection protrusion 16, and the upper side of the label tape 2 which is the tip side of the retracting prevention part 47 does not contact the tape contact surface 47a. Further, the reason also is that when the label tape 2 is fed, the tip of the retracting prevention part 47 is separated from the label tape 2 by the tension of the label tape 2, and the retracting prevention part 47 is bent in the bending direction B. In this manner, the retracting prevention part 47 is bent to suppress that in the area which reaches from the retracting prevention part 47 to the platen roller 7, the tape length direction of the label tape 2 is curved excessively.

Figure 9:
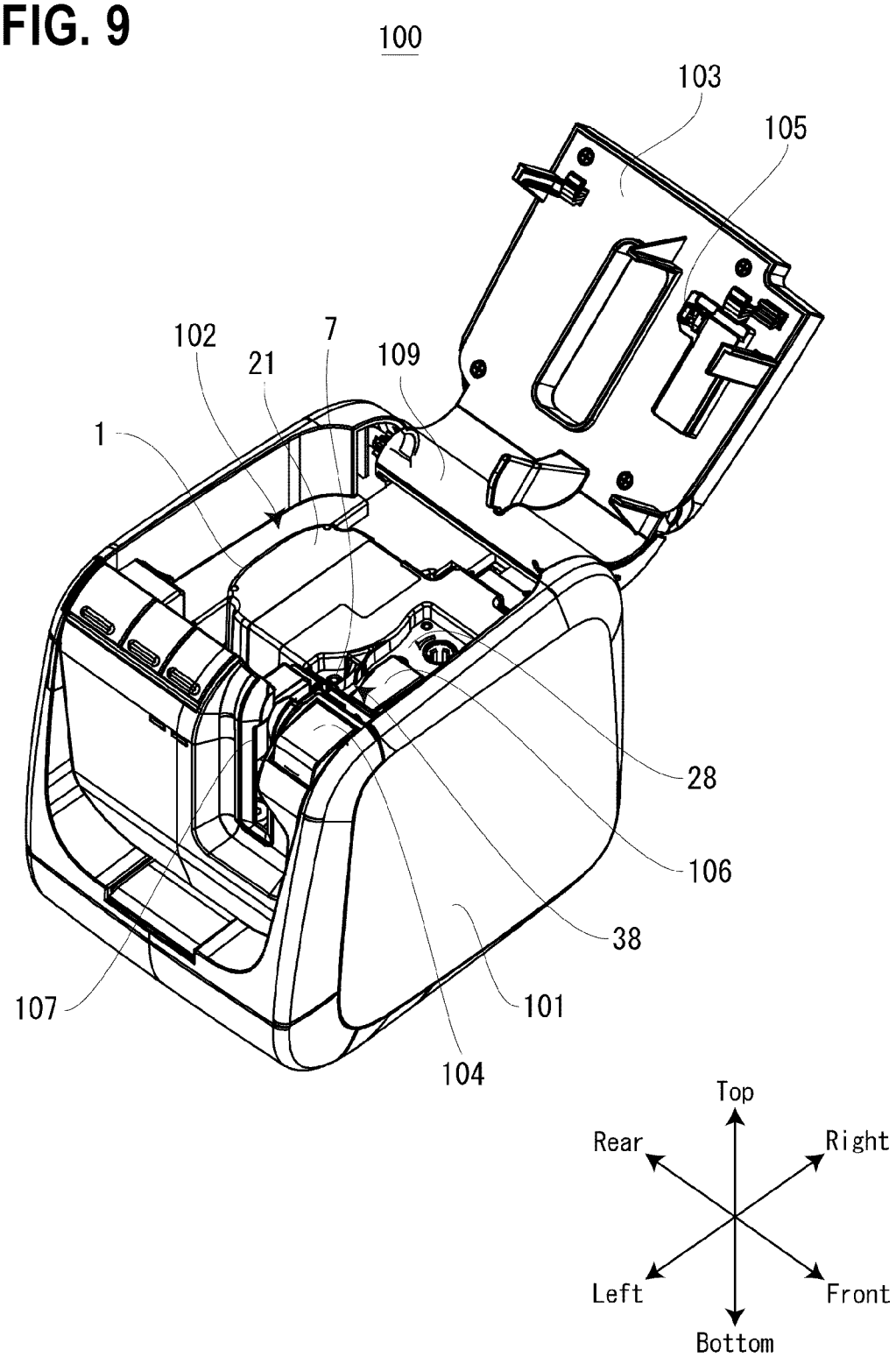
FIG. 9 is a perspective view illustrating the tape printing apparatus mounted in the tape cartridge illustrated in FIG. 3 in a state where the opening/closing lid is opened.

The tape printing apparatus 100 will be described with reference to FIGS. 8 and 9. The tape printing apparatus 100 obtains printing data obtained from a personal computer and the like, and the printing is performed on the label part 13 of the label tape 2 on the basis of the obtained printing data.

The tape printing apparatus 100 includes an apparatus case 101, a cartridge mounting part 102, an opening/closing lid 103, a lid opening button 104, the optical sensor 105, the printing head 106, and a tape discharge port 107. In addition, the tape printing apparatus 100 is not illustrated in FIGS. 8 and 9, and includes a controller 108 (see FIGS. 10A to 10F) which integrally controls the entire tape printing apparatus 100.

The apparatus case 101 has a substantially cubic shape, and configures the outer shell of the tape printing apparatus 100. The cartridge mounting part 102 is provided in the uppers surface of the apparatus case 101. The tape cartridge 1 is detachably mounted in the cartridge mounting part 102 in such a posture that the upper case 21 is directed to the upper side. For this reason, when the tape cartridge 1 is mounted in the cartridge mounting part 102, the exposed area 38 provided in the upper surface of the upper case 21 (low wall 28) is directed to the upper side.

The opening/closing lid 103 opens and closes the cartridge mounting part 102. The opening/closing lid 103 is locked in a closed state by a lock mechanism (not illustrated). The lid opening button 104 releases the locking of the opening/closing lid 103 by the lock mechanism. That is, when the lid opening button 104 is pushed, the opening/closing lid 103 is opened upward while a hinge 109 provided in the right end of the opening/closing lid 103 is set as a center.

The optical sensor 105 is provided inside the opening/closing lid 103. When the opening/closing lid 103 is closed, the optical sensor 105 opposes the exposed area 38 of the tape cartridge 1 mounted in the cartridge mounting part 102. The optical sensor 105 is, for example, a permeable photo interrupter. When the detection front-end 16a of the detection protrusion 16 passes through the optical sensor 105, an output voltage from the optical sensor 105 is changed, and thus the passage of the detection front-end 16a is detected. Similarly, when the detection rear-end 16b of the detection protrusion 16 passes through the optical sensor 105, the output voltage of the optical sensor 105 is changed, and thus, the passage of the detection rear-end 16b is detected.

The printing head 106 is provided in the cartridge mounting part 102. As described above, when the tape cartridge 1 is mounted in the cartridge mounting part 102, the printing head 106 enters the upper head opening 33 and the lower head opening 45 of the tape cartridge 1. In a state where the opening/closing lid 103 is opened, the printing head 106 is separated from the platen roller 7. When the opening/closing lid 103 is closed, the printing head 106 approaches the platen roller 7 by a conjunction mechanism (not illustrated), and holds the label tape 2 and the ink ribbon 4 together with the platen roller 7. The printing head 106 generates heat in a state where the label tape 2 and the ink ribbon 4 is held between the printing head 106 and the platen roller 7, so that the printing is performed on the label part 13 of the label tape 2 in order.

Although not illustrated, a platen driving shaft and a ribbon winding driving shaft are provided in the cartridge mounting part 102. When the tape cartridge 1 is mounted in the cartridge mounting part 102, the platen driving shaft is engaged in the platen roller 7, and the ribbon winding driving shaft is engaged in the ribbon winding reel 6. The platen driving shaft and the ribbon winding driving shaft are rotated when the power generated from a feeding motor 111 (see FIGS. 10A to 10F) is transmitted. The platen driving shaft is rotated to rotate the platen roller 7, and the ribbon winding driving shaft is rotated to rotate the ribbon winding reel 6.

The tape discharge port 107 is provided in the left surface of the apparatus case 101. The tape discharge port 107 is connected with the cartridge mounting part 102. The label tape 2 fed from the tape cartridge 1 mounted in the cartridge mounting part 102 is discharged from the tape discharge port 107 outside the tape printing apparatus 100. Incidentally, a tape cutter 112 (see FIGS. 10A to 10F) is built-in between the cartridge mounting part 102 and the tape discharge port 107. When the power generated from the cutter motor 113 (see FIGS. 10A to 10F) is transmitted, the tape cutter 112 performs a cutting operation, so as to cut the label tape 2 in a tape width direction.

Figure 10A:
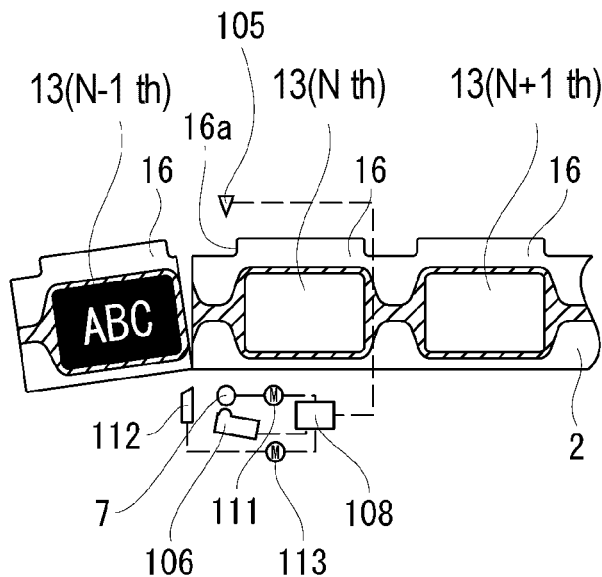
FIGS. 10A to 10F are views for explaining a printing operation of the tape printing apparatus mounted with the tape cartridge illustrated in FIG. 3.

The printing operation which is executed by the tape printing apparatus 100 will be described with reference to FIGS. 10A to 10F. FIG. 10A illustrates a state where the (n−1)-th label part 13 counting from a tape delivery tip is cut and separated by the previous printing operation. At this time, the detection front-end 16a of the detection protrusion 16 which corresponds to the n-th label part 13 is positioned on slightly (for example, about 4 mm) tape feeding upstream side from the detecting position of the optical sensor 105.

When a command to perform the printing is received, the controller 108 drives the feeding motor 111. Accordingly, the platen roller 7 and the ribbon winding reel 6 are rotated to begin the feeding of the label tape 2 and the ink ribbon 4.

Figure 10D:
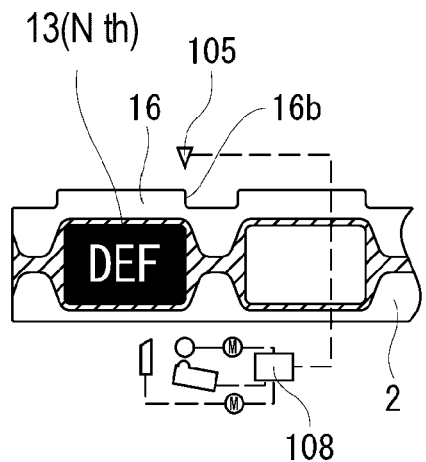
Figure 10B:
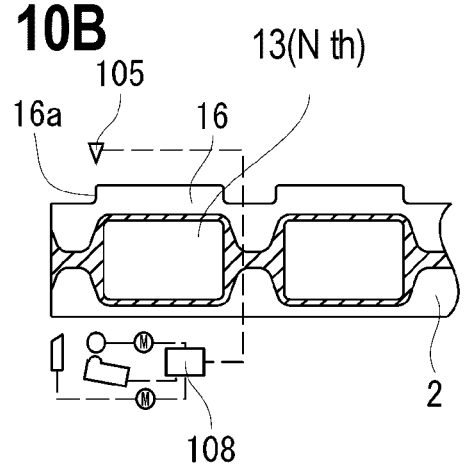

As illustrated in FIG. 10B, when the detection front-end 16a of the detection protrusion 16 which corresponds to the n-th label part 13 arrives at the optical sensor 105, the controller 108 detects the passage of the detection front-end 16a on the basis of the change of the output voltage generated from the optical sensor 105.

Figure 10E:
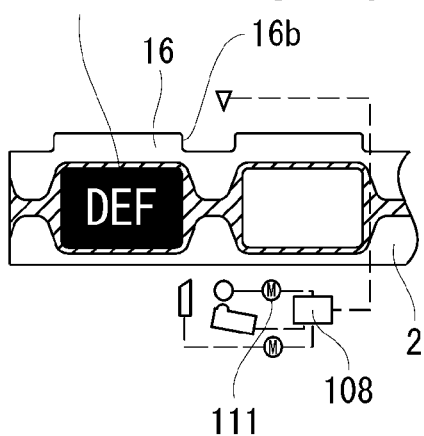
Figure 10C:
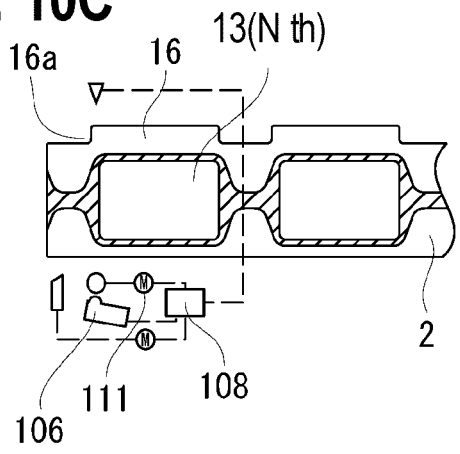

As illustrated in FIG. 10C, when the passage of the detection front-end 16a is detected, the controller 108 starts to drive the printing head 106 at the time when the feeding motor 111 is driven, such that the label tape 2 is fed by the distance which corresponds to a dimension between the detection front-end 16a in the tape length direction and a predetermined printing start position (for example, a position protruding slightly to the tape delivery front end from the end of the label part 13 on the tape delivery front end side) of the n-th label part 13. Accordingly, the printing is started from the printing start position of the n-th label part 13. The controller 108 controls the printing head 106 on the basis of the obtained printing data.

As illustrated in FIG. 10D, when the detection rear-end 16b of the detection protrusion 16 corresponding to the n-th label part 13 arrives at the optical sensor 105, the controller 108 detects the passage of the detection rear-end 16b on the basis of the change of the output voltage generated from the optical sensor 105.

As illustrated in FIG. 10E, when the passage of the detection rear-end 16b is detected, the controller 108 stops the feeding motor 111 after the feeding motor 111 is driven, such that the label tape 2 is fed by the distance which corresponds to the dimension between the detection rear-end 16b in the tape length direction and a predetermined cutting position (for example, a position slightly on a tape delivery rear end side from the tape delivery rear end of the label part 13) of the n-th label part 13.

Figure 10F:
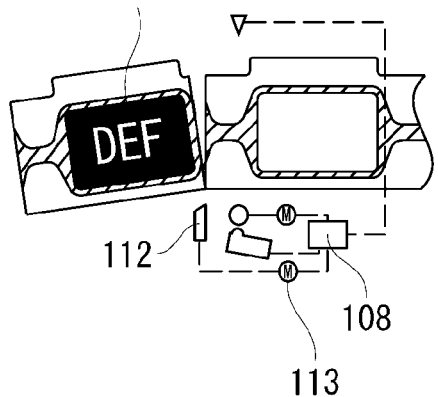

As illustrated in FIG. 10F, the controller 108 drives the cutter motor 113 after the feeding motor 111 is stopped. Accordingly, the tape cutter 112 performs the cutting operation so that the n-th label part 13 is cut and separated at the cutting position. In this manner, the tape printing apparatus 100 performs the printing operation, so as to obtain the label part 13 in which a desired image is printed.

Figure 11:
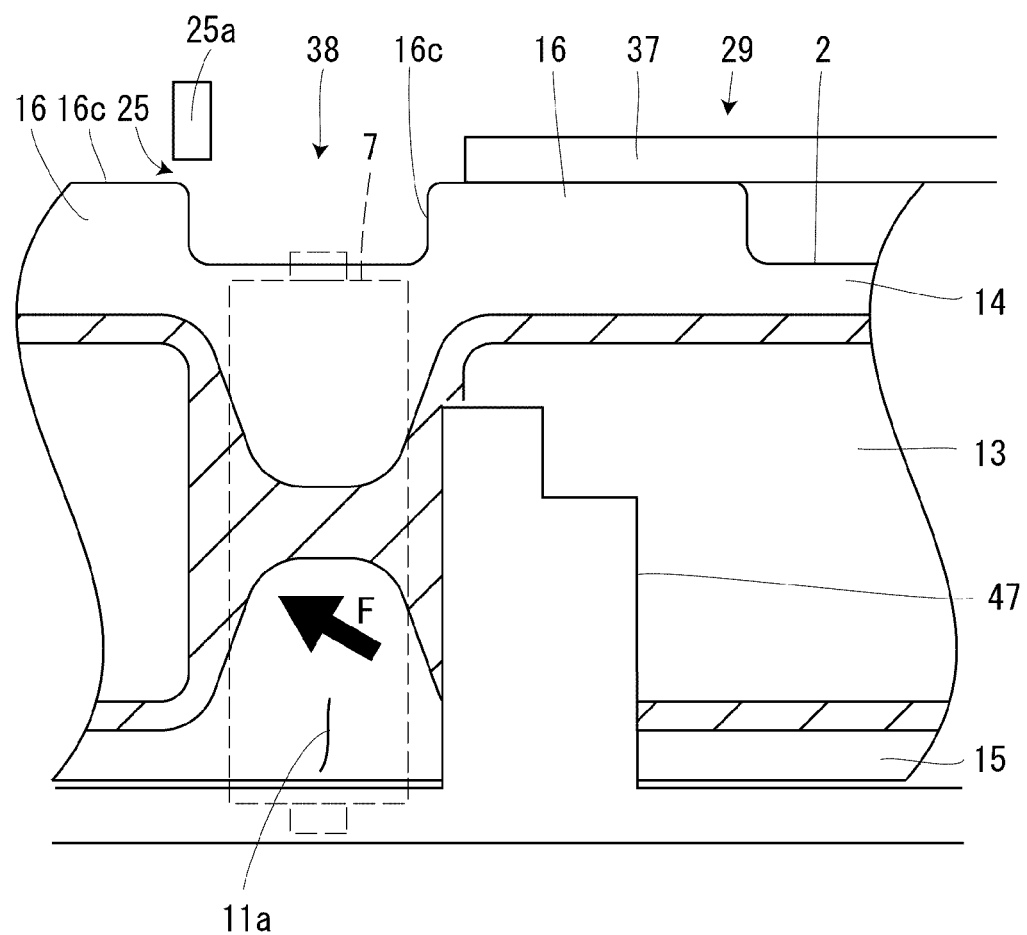
FIG. 11 is a view for explaining a position regulating part of the tape cartridge illustrated in FIG. 3.

The position regulating part 37 will be described in detail with reference to FIG. 11. In a nip position P (see FIG. 4) between the platen roller 7 and the printing head 106, a force F acts on the label tape 2 such that the label tape is fed obliquely toward the protruding side of the detection protrusion 16, that is, upward, in some cases. Particularly, when the wrinkle 11a occurs in the second non-label part 15 provided on the lower side in the label tape 2, in the nip position P, the force F easily acts on the label tape 2 such that the label tape is fed obliquely toward the protruding side of the detection protrusion 16. The wrinkle 11a occurs, for example, when the printing tape 11 is partially peeled from the mount tape 12, and the peeled place of the printing tape 11 is folded to be shortened in the tape length direction, so that the back surfaces are stuck to each other. The wrinkle 11a has a tendency to easily occur in the second non-label part 15 compared to the label part 13 or the first non-label part 14. It considered that the reason is that, as described above, the lower side of the label tape 2 is curved largely in the retracting prevention part 47 compared to the upper side.

With regard to this, according to the tape cartridge 1 of this embodiment, in the area provided with the cover 29, the position regulating part 37 regulates the position of the label tape 2 on the protruding side of the detection protrusion 16, that is, the upper side. For this reason, even in a case where the force F acts on the label tape 2 such that the label tape is fed obliquely upward, in the area provided with the cover 29 and the exposed area 38 adjacent to the cover 29, it is suppressed that the label tape 2 obliquely moves upward. Accordingly, when the detection protrusion 16 passes through the upper feeding port 25, it is suppressed that the detection protrusion 16 is caught by the upper edge 25a of the upper feeding port 25. That is, it is suppressed that the jamming of the label tape 2 in the tape cartridge 1 occurs.

Figure 12A:
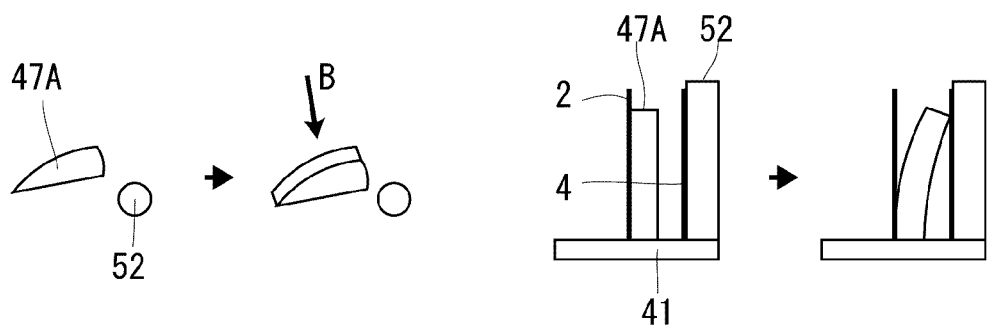
FIGS. 12A and 12B are views illustrating a state before and after a retracting prevention part of a tape cartridge according to a comparative example of the present invention is bent.

The retracting prevention part 47 will be described in detail with reference to FIGS. 12A to 12C. FIG. 12A illustrates a retracting prevention part 47A according to a comparative example of the present invention. The retracting prevention part 47A does not include the upstream base end 56. In this case, since a rigidity of the retracting prevention part 47A is low, an amount in which the retracting prevention part 47A is bent by the tension of the label tape 2 is large. For this reason, the ink ribbon 4 is nipped between the second ribbon guide part 52 provided in the retracting prevention part 47A in the bending direction B and the tip of the bent retracting prevention part 47A, so that there is a risk that the feeding of the ink ribbon 4 is hindered, for example, the wrinkle 11a occurs in the ink ribbon 4.

Figure 12B:
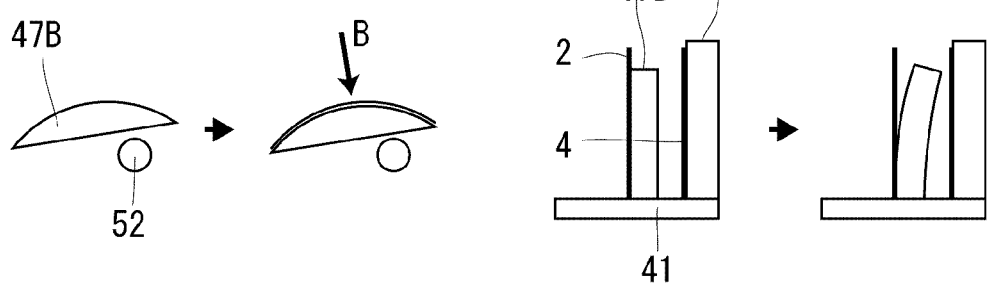

FIG. 12B illustrates a retracting prevention part 47B according to the comparative example of the present invention. In the retracting prevention part 47B, the place corresponding to the upstream base end 56 of the retracting prevention part 47 of this embodiment has the same protruding height as the tape holding part 55. That is, similarly to the retracting prevention part 47, the retracting prevention part 47B has a substantially arcuate shape in top view on the whole, but the tip on the tape feeding upstream side is not notched. In this case, the retracting prevention part 47B is thicker than the retracting prevention part 47A, and the rigidity of the retracting prevention part 47B is high, whereby an amount in which the retracting prevention part 47B is bent by the tension of the label tape 2 is small. However, in the retracting prevention part 47B, the tip of the place which opposes the second ribbon guide part 52 is not notched. Therefore, there is a risk that the ink ribbon 4 is nipped between the second ribbon guide part 52 and the tip of the bent retracting prevention part 47B, and thus the feeding of the ink ribbon 4 is hindered.

Figure 12C:
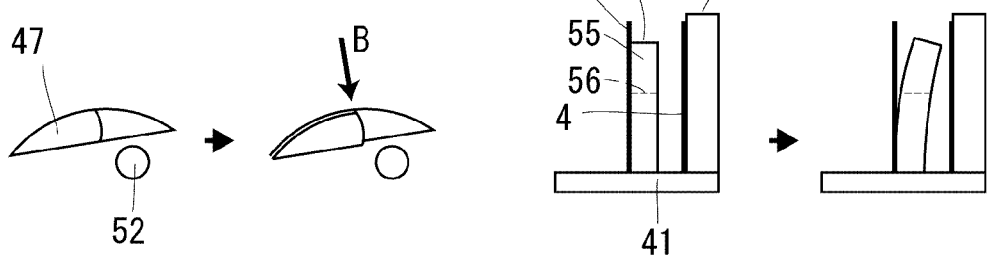
FIG. 12C is a view illustrating a state before and after a retracting prevention part of the tape cartridge illustrated in FIG. 3 is bent.

FIG. 12C illustrates the retracting prevention part 47 according to this embodiment. In this case, the rigidity of the retracting prevention part 47 is higher than the retracting prevention part 47A not having the upstream base end 56, and thus an amount in which the retracting prevention part 47 is bent by the tension of the label tape 2 is small. Therefore, even when the retracting prevention part 47 is bent, the tip of the retracting prevention part 47 does not approach the second ribbon guide part 52 particularly. Further, the upstream base end 56 which opposes the second ribbon guide part 52 is not provided in the tip of the tape holding part 55. That is, in the retracting prevention part 47, the tip of the place which opposes the second ribbon guide part 52 is notched. For this reason, it is suppressed that the ink ribbon 4 is nipped between the second ribbon guide part 52 and the tip of the bent retracting prevention part 47.

As described above, according to the tape cartridge 1 of this embodiment, it is suppressed that the ink ribbon 4 is nipped between the second ribbon guide part 52 and the tip of the bent retracting prevention part 47. In addition, the retracting prevention part 47 is bent to suppress that the tape length direction of the label tape 2 is excessively curved in the area which reaches from the retracting prevention part 47 to the platen roller 7. As a result, it is suppressed that the printing tape 11 is partially peeled from the mount tape 12, and it is suppressed that the wrinkle 11a occurs in the printing tape 11. Therefore, in the tape cartridge 1, it can be suppressed that the wrinkle 11a occurs in the printing tape 11, and the feeding of the ink ribbon 4 can be stabilized.

According to the tape cartridge 1 of this embodiment, even in a case where the force F acts on the label tape 2 such that the label tape is fed obliquely upward, the position regulating part 37 is provided to suppress that the label tape 2 obliquely moves upward in the area provided with the cover 29 and the exposed area 38 adjacent to the cover 29.

According to the tape cartridge 1 of this embodiment, since the bending amount of the retracting prevention part 47 is small, compared to a case where the bending amount of the retracting prevention part 47 is large, the curve degree of the label tape 2 in the tape length direction is large in the area which reaches from the retracting prevention part 47 to the platen roller 7.

For this reason, in the area which reaches from the retracting prevention part 47 to the platen roller 7, the label tape 2 is strong with respect to the force pushed from the tape width direction. For this reason, in a case where the protruding end 16c of the detection protrusion 16 abuts on the position regulating part 37 provided on the tip side of the retracting prevention part 47 in the protruding direction, a pressing force effectively acts on the label tape 2 to an opposite side to the protruding side of the detection protrusion 16, that is, downward. Therefore, the position of the label tape 2 on the protruding side of the detection protrusion 16, that is, on the upper side is regulated effectively.

According to the tape cartridge 1 of this embodiment, the inter-platen cover distance D is 6 mm or less. Thus, in the position considerably close to the nip position P, the protruding end 16c of the detection protrusion 16 contacts the position regulating part 37, so that the position of the label tape 2 on the protruding side of the detection protrusion 16 is regulated.

For this reason, in the nip position P, even in a case where the force acts on the label tape such that the label tape is fed obliquely toward the protruding side of the detection protrusion 16, in the area provided with the exposed area 38 and the cover 29, it is more effectively suppressed that the label tape 2 obliquely moves upward.

Incidentally, the label tape 2 is an example of a "tape-shaped member". The optical sensor 105 is an example of a "detection part". The upper platen engaging hole 32 is an example of a "platen engaging hole".

The present invention is not limited to the above-described embodiment, and various configurations can be adopted in a range without departing from the spirit and scope of the invention.

REFERENCE SIGNS LIST

1: Tape cartridge
2: Label tape
8: Cartridge case
16: Detection protrusion
29: Cover
35: First cover
36: Second cover
37: Position regulating part
38: Exposed area
100: Tape printing apparatus
105: Optical sensor

The invention claimed is:

1. A tape cartridge which is mounted in a tape printing apparatus provided with a detection part, comprising:
   a tape-shaped member which has a detection protrusion of which a lateral side partially protrudes in a tape width direction;
   a cartridge case in which a tape roll formed by winding the tape-shaped member into a roll shape is contained; and
   a retracting prevention part which is cantilevered by a bottom wall of the cartridge case and is bent elastically by receiving a tension of the tape,
   wherein an exposed area is provided outside the cartridge case, the exposed area being where the detection protrusion provided in the tape-shaped member delivered from the tape roll and fed in a length direction of the tape-shaped member is exposed,
   the cartridge case has a cover which covers the tape-shaped member delivered from the tape roll in a tape feeding upstream side from the exposed area, and
   the cover includes:
      a first cover which covers either one of a front side or a back side of the detection protrusion;
      a second cover which covers the other of the front side or the back side of the detection protrusion; and
      a position regulating part which is provided to connect the first cover and the second cover;
         wherein the position regulating part is provided on a tip side of the retracting prevention part; and
      wherein when a force acts on the tape such that the tape is fed obliquely upward, the position regulating part contacts a protruding end of the detection protrusion to regulate a position of the tape-shaped member in a protruding side of the detection protrusion.

2. The tape cartridge according to claim 1, wherein
   the cartridge case is provided with a protruding opening through which the detection protrusion protrudes, and
   the cover is provided in a tape feeding upstream end of the protruding opening.

3. The tape cartridge according claim 1, further comprising:
   a platen roller which feeds the tape-shaped member, by rotation, nipped between a printing head and the platen roller,
   wherein the cartridge case is provided with a platen engaging hole with which the platen roller is supported, and
   a distance between an end of the platen engaging hole on a side of the protruding opening and a tape feeding downstream end of the position regulating part is 6 mm or less.

4. The tape cartridge according to claim 2, further comprising:
   a platen roller which feeds the tape-shaped member, by rotation, nipped between a printing head and the platen roller,
   wherein the cartridge case is provided with a platen engaging hole with which the platen roller is supported, and
   a distance between an end of the platen engaging hole on a side of the protruding opening and a tape feeding downstream end of the position regulating part is 6 mm or less.

* * * * *